United States Patent

Gay

[11] Patent Number: 5,312,464
[45] Date of Patent: May 17, 1994

[54] CROSS-FLOW FILM FILL MEDIA WITH DRIFT ELIMINATOR

[75] Inventor: George A. Gay, Califon, N.J.

[73] Assignee: Munters Corporation, Fort Myers, Fla.

[21] Appl. No.: 66,210

[22] Filed: May 25, 1993

[51] Int. Cl.$^5$ .................................................. B01F 3/04
[52] U.S. Cl. .................................... 55/257.2; 55/440; 261/112.2
[58] Field of Search .................... 55/257.2, 440, 444; 261/112.2

[56] References Cited

U.S. PATENT DOCUMENTS

| | | | |
|---|---|---|---|
| 3,450,393 | 6/1969 | Munters | 261/112.2 |
| 3,899,427 | 8/1975 | Connelly et al. | 55/440 |
| 4,240,814 | 12/1980 | Regehr et al. | 55/444 |
| 4,337,216 | 6/1982 | Korsell | 261/112.2 |
| 4,548,766 | 10/1985 | Kinney, Jr. et al. | 261/112.2 |
| 4,801,410 | 1/1989 | Kinney, Jr. et al. | 261/112.2 |
| 5,203,894 | 4/1993 | Chowaniec | 55/440 |
| 5,230,725 | 7/1993 | Chowaniec | 55/444 |

*Primary Examiner*—Tim Miles
*Attorney, Agent, or Firm*—Fitzpatrick, Cella, Harper & Scinto

[57] ABSTRACT

A gas and liquid contact body for use in a gas and liquid contact apparatus in which gas and liquid flow in cross-flow relationship to each other includes a plurality of corrugated sheets having opposed first and second edge which are facially opposed in substantially parallel relationship to one another to define a plurality of intersecting and intercommunicating passages allowing the passage of gas and liquid therethrough. The first edges of the sheets are located generally in the same plane and define a gas inlet edge of the contact body. Alternate sheets in the body are narrower from their first to their second edges than the remainder of the sheets in the body. The second edges of the sheets define an air outlet portion in the body wherein the second edges of the alternate sheets define spaces between the wider adjacent sheets at said outlet portion. Separate undulating drift eliminator sheets are located in the spaces to restrict the discharge of liquid droplets from the air outlet portion of the contact body

13 Claims, 5 Drawing Sheets

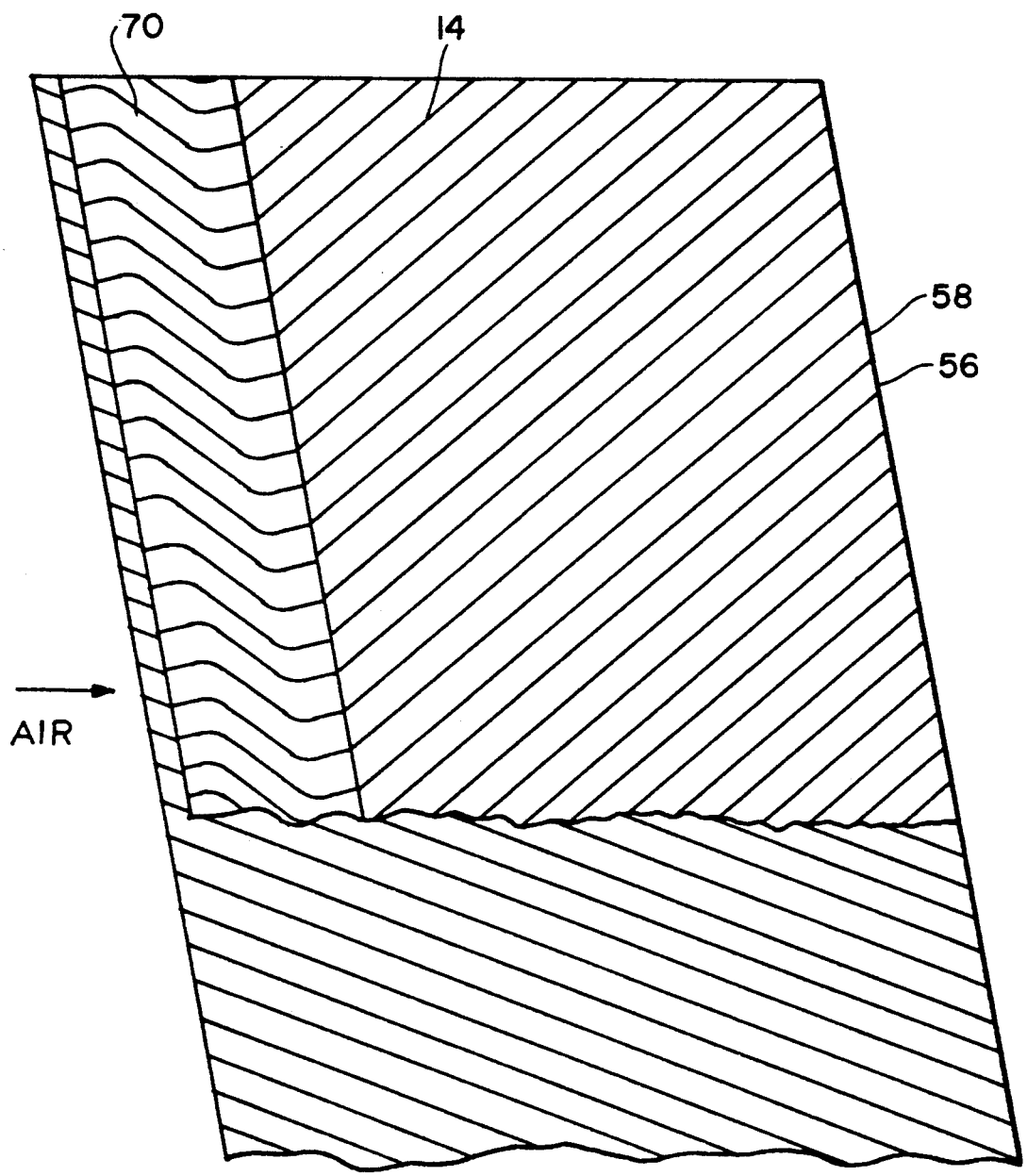
F I G. 5

CROSS-FLOW FILM FILL MEDIA WITH DRIFT ELIMINATOR

BACKGROUND OF THE INVENTION

The present invention relates to gas and liquid contact apparatus, and more in particular to a contact body which includes an internal drift eliminator section.

Gas and liquid contact bodies for use in evaporative coolers, humidifiers, heat exchangers, and the like, have been proposed in the past which utilize cross-flow of gas and liquid in the contact body in order to remove heat from the liquid. Such contact bodies have been proposed which are constructed of cross-corrugated sheets of material such as plastic, cellulose, paper and other kinds of materials, as are disclosed in U.S. Pat. Nos. 3,792,841; 3,395,903; and 3,500,615. Such contact bodies have been generally satisfactory in use and commercially successful.

Typically, such contact bodies are used in an enclosure or casing in which the liquid is distributed over the top of the fill and allowed to flow by force of gravity through the interstices or passages in the contact body with the currents of air which are drawn through the body by a power driven fan assembly o the like. It has been found that there is tendency for water particles in the contact body to drift or be carried along with the rapidly moving air currents toward the air outlet side of the contact body. As a result, separate drift eliminators are sometimes provided adjacent the air discharge space of the fill assembly in order to eliminate or minimize water loss from the contact apparatus through the air discharge opening thereof. Such mist liminators have been separate elements positioned downstream of the outlet side of the contact body, as disclosed, for example, in U.S. Pat. No. 3,500,615.

The separate drift eliminators of the prior art require additional space within the contact apparatus in order to accommodate the additional width thereof. They also are not capable of returning the liquid to the contact body where it can be further cooled by continuous passage through the contact body.

It is an object of the present invention to provide an improved contact body in which a mist or drift eliminator is included within the contact body itself.

Another object of the present invention is to provide a improved gas/liquid contact body of the type described.

A further object of the invention is to provide a gas/liquid contact apparatus which includes a drift eliminator and which is of the same width as a conventional contact body apparatus.

Yet another object of the present invention is to provide a combination gas contact body with drift eliminator that is relatively simple in construction and inexpensive to manufacture.

In accordance with an aspect of the present invention, a gas and liquid contact body is provided for use in a gas and liquid contact apparatus in which gas and liquid flow in cross-flow relationship to one another. The contact body has opposed edge portions and includes first and second sets of corrugated sheets having corrugations formed therein disposed in a direction transversely of the horizontal plane of the contact body. The sheets of the first set are disposed alternately with the sheets of the second set and the corrugations of the first set cross the corrugations of the second set. The sheets have first and second opposed edges located in the direction of gas flow and the corrugations define passageways in the contact body between the edges of the sheets. The sheets in the first set are narrower, edge to edge, than the sheets of the second set thereby to define a space between each of the second sheets at one edge of the contact body. A separate narrow sheet having undulations formed therein is positioned in each of those spaces. The undulations of those separate narrow sheets are inclined oppositely from the inclination of the corrugations of the first sheets to restrict moisture droplets from leaving the contact body through the edge thereof.

BRIEF DESCRIPTION OF THE DRAWINGS

The above and other objects, features and advantages of the present invention will be apparent from the following detailed description of illustrative embodiments thereof, which is to be read in connection with the accompanying drawings wherein:

FIG. 5 is an elevational view similar to FIG. 3 of yet another embodiment of the present invention.

DETAILED DESCRIPTION OF THE INVENTION

Figure 1:
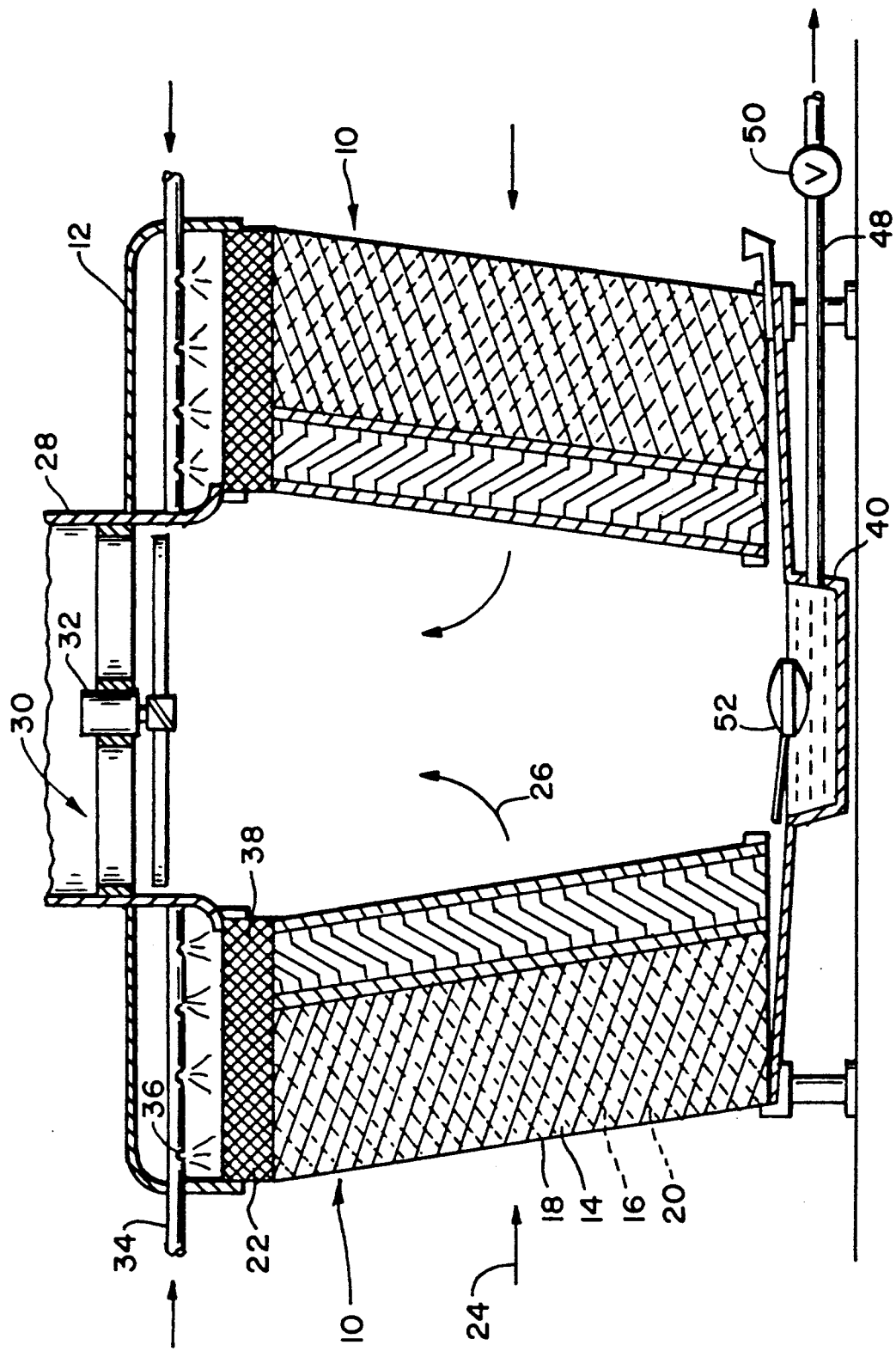
FIG. 1 is a vertical longitudinal section of a gas/liquid contact apparatus including contact bodies constructed in accordance with the present invention.

Referring now to the drawings in detail and initially to FIG. 1 thereof, a gas/liquid contact apparatus, such as, for example, a cooling tower or the like, is illustrated which includes a pair of contact bodies or packings 10 enclosed within a casing or housing 12. The contact bodies are passed by gas and liquid, such as, for example, air and water, in cross relation. The contact bodies or packings 10 are composed of thin sheets of synthetic material, or the like, as described above, which are undulated or corrugated and positioned either vertically or at a slightly inclined angle, as illustrated in FIG. 1.

Figure 2:
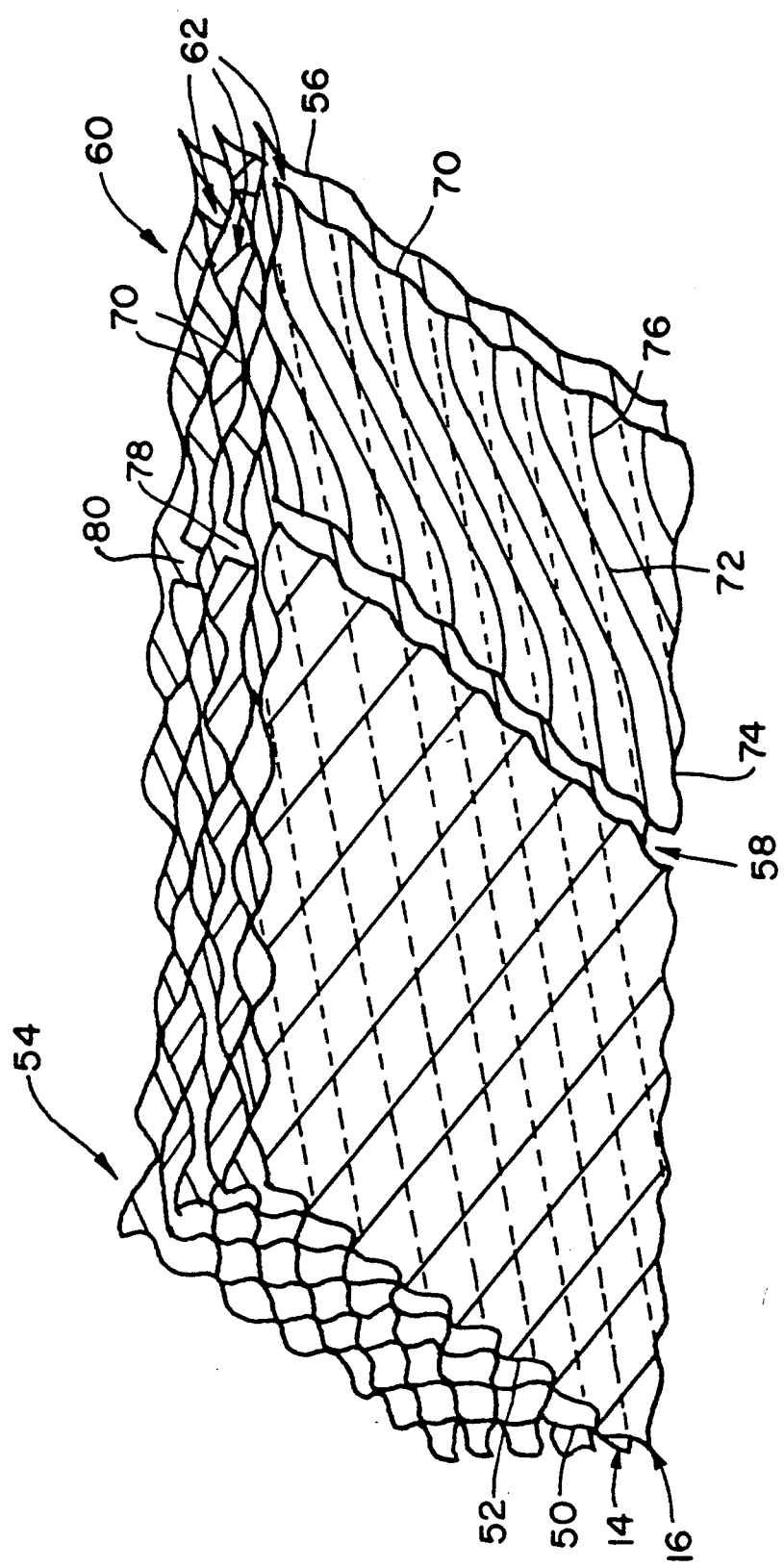
FIG. 2 is a partial perspective view of the liquid/gas contact body of the present invention showing the separate drift eliminator sheet.
Figure 3:
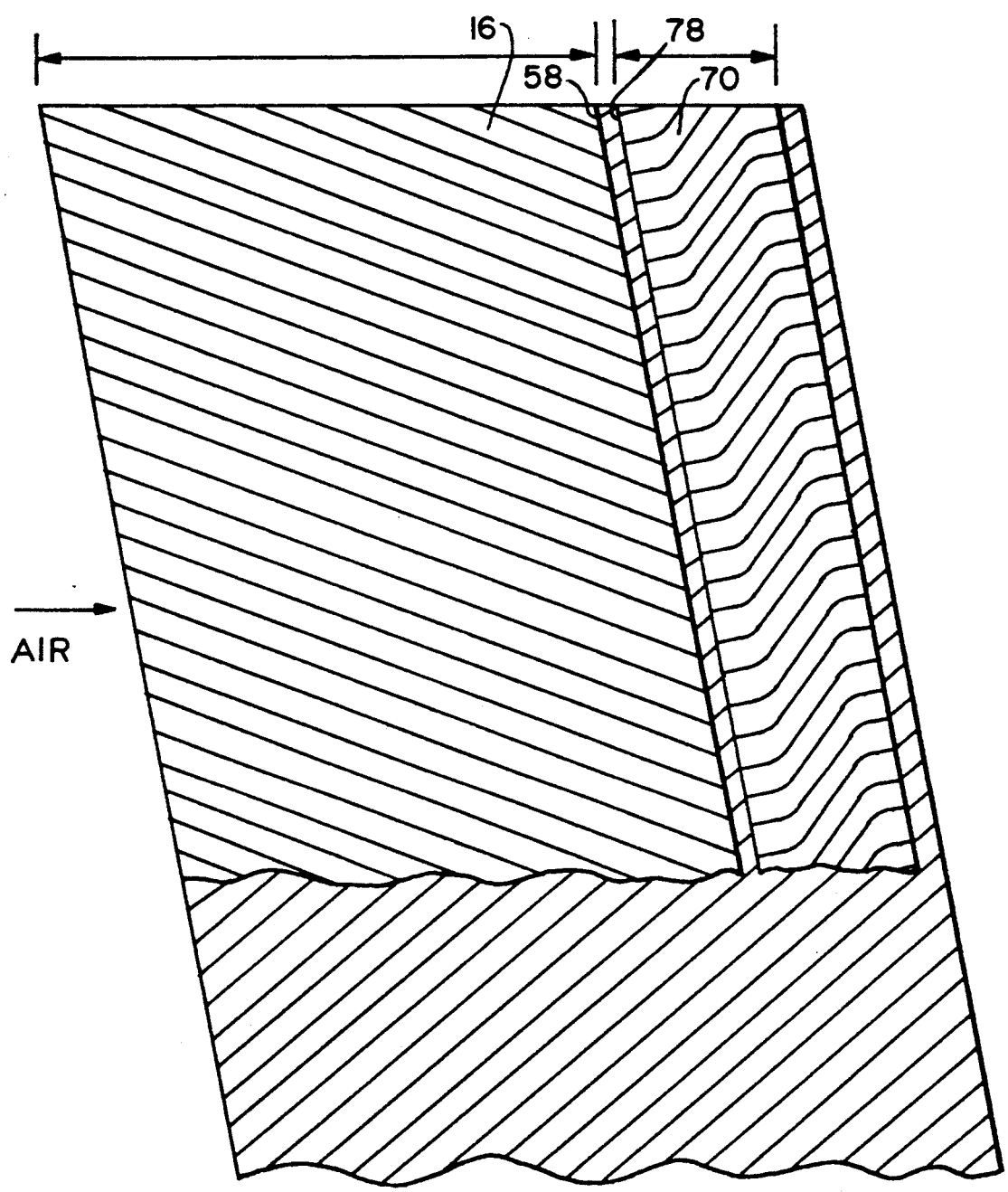
FIG. 3 is a side view of a contact body constructed in accordance with the present invention with parts broken away.

As seen in FIGS. 1 and 2, each contact body is formed of two sets of sheets 14, 16, having corrugations 18, 20 formed therein which cross one another thereby to form horizontal as well as vertical channels extending through the contact body. These channels will vary in width from zero where the sheets contact one another to a width which is substantially twice the height of the corrugations. The height of the corrugations may range from 5 to 15 mm or more as is known in the art. The corrugations in the sheets can be positioned at equal angles or at unequal angles, as disclosed in U.S. Pat. No. 3,792,841. In either event, the corrugations in one set of sheets incline downwardly in the direction of gas flow and the corrugations in the other set of sheets are inclined upwardly in the direction of gas flow.

Gas is admitted to the contact bodies through the openings 22 in the casing 12 and passed through the channels or passageways defined by the corrugated sheets in a horizontal direction generally as indicated by the arrows 24, 26. The casing 12 has an outlet opening 28 formed therein for the gas at its top and a fan 30 is mounted in the opening. The fan is driven by a motor 32, as is well known in the art, in order to draw the gas through the contact bodies.

Water or other liquid is supplied to the contact bodies through the pipes 34 which along their bottom sides are provided with outlet openings 36 that are spaced from one another in the longitudinal direction of the pipes. Beneath the openings 36 there are a plurality of veins or baffles 38 upon which the water jets impinge and are broken up so that the liquid is distributed along the top surface of the contact body. Other means of distributing the liquid through the contact body can also be provided, such as, for example, by the use of perforated pans, or the like, positioned above the top edges of the contact body.

As is well known in the art, the liquid supplied to the top of the contact bodies flows downwardly in the contact body under the influence of gravity where it is met by the cross-flowing gas or air for cleaning the gas, cooling, heating or dehumidification purposes.

The corrugated sheets in the sets 14, 16 have gas inlet edge portions 50, 52, as illustrated in FIG. 2, which are located generally in the same plane in alignment with each other to define an air inlet side of the contact body 54. The sheets have second opposed edges 56, 58, respectively, defining an air outlet portion of the contact body. However, the sheets 16 are narrower in width between their edges 52, 58, than the sheets 14 between their edges 50, 56. Thus, the edges 58, 56 of the sheets at the outlet side 60 of the contact body are offset from one another and define spaces 62 between adjacent outlet sections of the sheets 14.

In accordance with the present invention, a separate drift eliminator sheet 7 is provided within each of the spaces 62 in the contact body between adjacent sheets 14, 16. Separate sheets 70 have an undulating configuration to define a drift eliminator profile. A variety of such profiles are known in the art. In the illustrated embodiment, the drift eliminator sheets 70 are corrugated with generally Z-shaped corrugations which include inclined sections 72 as well as relatively straight inlet and outlet sections 74, 76. Sheets 70 are positioned in the contact body, as illustrated in FIG. 2, to be inclined in an opposite direction from the direction of corrugations in their companion sheet 16. Preferably, the corrugations of the sheet 16 are positioned to be inclined downwardly in the direction of gas flow. Thus, the corrugations 72 of the drift eliminator sheets are positioned to be inclined upwardly.

By this construction of the present invention, gas droplets which would otherwise be discharged from the outlet portion 60 of the contact body will be entrained in the undulations or corrugations of the drift eliminator sheets 70 and trapped in the contact body. Because of the relative inclinations of the channels in the sheet 16 and the inclined corrugations of section 72 of the sheet 70, these liquid droplets will be retained within the contact body.

In the illustrative embodiments of the invention shown in FIG. 2, sheets 70 have an inner edge portion 78 which is slightly spaced from the edge portion of the adjacent sheet 16. As a result, a generally vertically extending channel 80 is defined within the contact body so that liquid droplets retained by the drift eliminator will be guided by the corrugations of the sheets 70 to the channel where they can drain downwardly within the channel to the sump 46. The droplets will also tend to be redistributed in contact with the corrugations in the sheets 16 and the sheets 14 for further contact with air in the contact body.

In the conventional manner housing 12 includes a discharge conduit 48 extending from the sump 46. The discharge of liquid from sump 46 is controlled through a valve 50 in conduit 48 and a float control mechanism 52 in the conventional manner, such as, for example, is described in U.S. Pat. No. 3,450,393.

Figure 4:
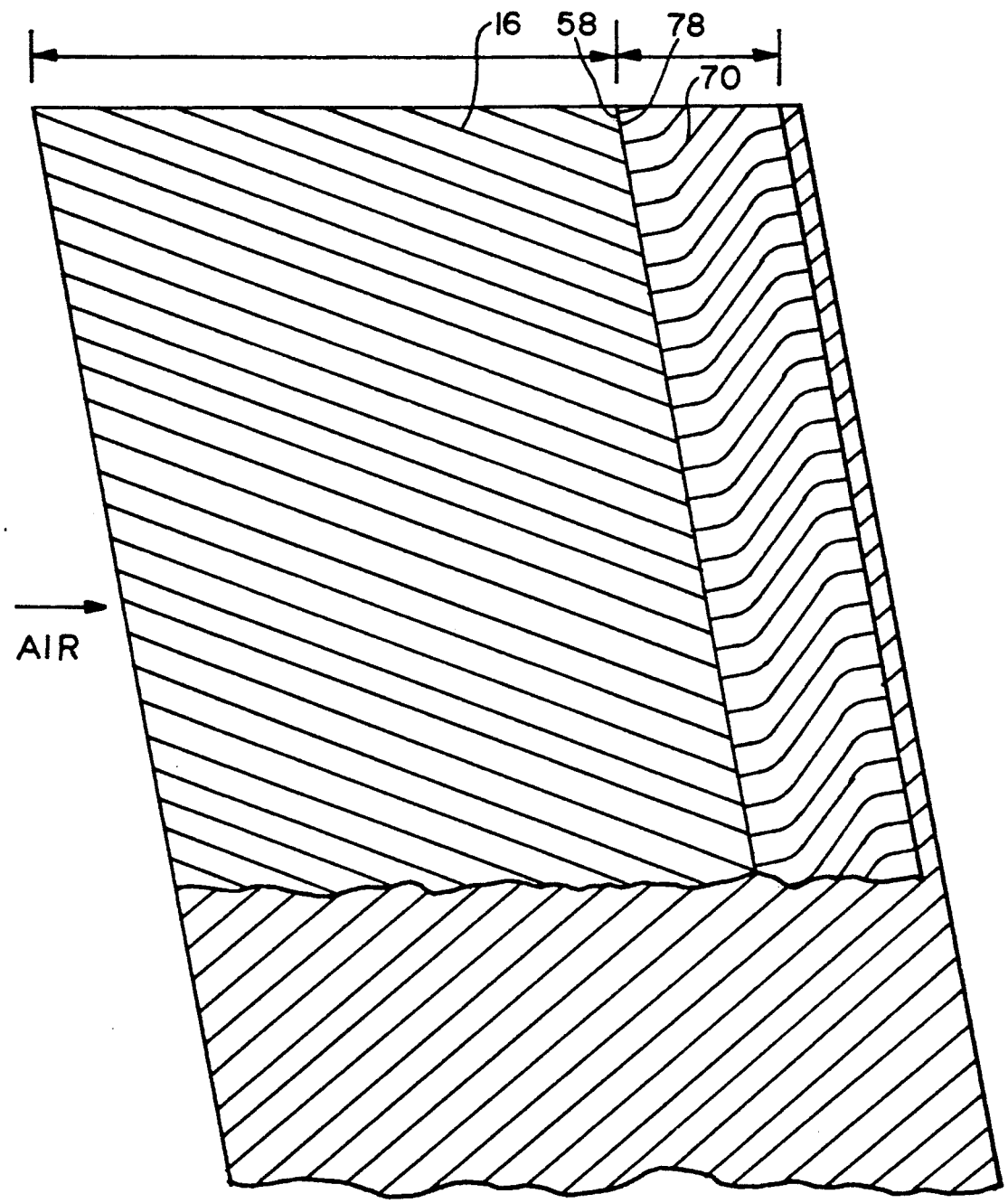
FIG. 4 is an elevational view similar to FIG. 3 of another embodiment of the present invention.

In another embodiment of the invention, illustrated in FIG. 4, the sheets 70 are positioned so that their edges 78 abut against the edges 58 of the sheets 16. This construction aids in better distribution of the retained liquid through the contact body.

In yet another embodiment of the invention, illustrated in FIG. 5, the drift eliminator sheets 70 are positioned on the air inlet side of the contact bodies. In this case, the outlet edges 58, 56 of the sheets 14, 16 are aligned so that their inlet edges are offset from one another and sheets 14 are narrower than sheets 16. The positioning of the mist eliminator sheets on the inlet side in this manner serves as a louver section in the fill to stop splash-out of liquid from the fill. This often occurs when the fan 30 is shut off and liquid tends to drain out of the contact body from the air inlet side.

As noted above, the sheets 70 are separately formed from the sheets 14, 16. Preferably, they are secured in place to the adjacent sheets 14, 16 by an adhesive or hot welding, or the like, as is conventional for binding the sheets 14, 16 together in prior art devices.

Although illustrative embodiments of the present invention have been described herein in detail, it is to be understood that the invention is not limited to those precise embodiments and that various changes and modifications may be effected therein by those skilled in the art without departing from the scope or spirit of this invention.

What is claimed is:

1. A gas and liquid contact body for use in a gas and liquid contact apparatus in which gas and liquid flow in cross-flow relationship to one another comprising a contact body having opposed edge portions and including first and second sets of corrugated sheets having corrugations formed therein disposed in a direction transversely of the horizontal plane of the contact body, the sheets of the first set being disposed alternately with the sheets of the second set with the corrugations of the first set crossing the corrugations of the second set, said sheets having first and second opposed edges in the direction of gas flow and said corrugations defining passageways in said body between the edges of said sheets, the sheets in said first set being narrower, edge to edge, than the sheets of said second set, thereby to define a space between each said second sheets at one edge of the contact body, and a separate sheet having undulations formed therein positioned in each of said spaces, said undulations being inclined oppositely from the inclinations of the corrugations of the first sheets to restrict moisture droplets from leaving said contact body through said one edge thereof.

2. A gas and liquid contact apparatus as defined in claim 1 wherein said opposed edges of the contact body define inlet and outlet edges and the corrugations in said first sheets are inclined downwardly in the direction of gas flow, said separate sheets being located along the gas outlet edge of the contact body.

3. A gas and liquid contact apparatus as defined in claim 1 wherein said separate sheets abut against the adjacent edges of the first sheets.

4. A gas and liquid contact apparatus as defined in claim 3 wherein said opposed edges of the contact body define air inlet and outlet edges and the corrugations in said first sheets are inclined upwardly in the direction of gas flow, said separate sheets being located along the gas inlet edge of the contact body.

5. A gas and liquid contact apparatus as defined in claim 1 wherein said separate sheets are spaced from the adjacent edges of the first sheets to define liquid discharge channels in said body between said first sheets and said separate sheets.

6. A gas and liquid contact apparatus as defined in claim 5 wherein said opposed edges of the contact body define inlet and outlet edges and the corrugations in said first sheets are inclined downwardly in the direction of gas flow, said separate sheets being located along the gas outlet edge of the contact body.

7. A gas and liquid contact apparatus as defined in claim 6 wherein the undulations of said separate sheets define a drift eliminator.

8. A gas and liquid contact body for use in a gas and liquid contact apparatus in which gas and liquid flow in cross flow relationship to one another comprising a plurality of corrugated sheets having opposed first and second edges and being facially opposed in substantially parallel relationship to one another to define a plurality of intersecting and intercommunicating passages allowing the passage of gas and liquid therethrough, said first edges of said sheets being located generally in the same plane and defining a gas inlet edge of the contact body, alternate sheets in said body being narrower from their first to their second edges than the remainder of the sheets in said body, said second edges of said sheets thereby defining an air outlet portion in the body wherein the second edges of the alternate sheets define spaces between the wider adjacent sheets at said outlet portion, and separate undulating drift eliminator sheets in said spaces.

9. A gas and liquid contact apparatus as defined in claim 8 wherein the corrugations of said alternate sheets are inclined downwardly in the direction of gas flow.

10. A gas and liquid contact apparatus as defined in claim 9 wherein said separate sheets abut against the adjacent second edges of the alternate sheets.

11. A gas and liquid contact apparatus as defined in claim 10 wherein the undulations of said separate sheets include at least one corrugated section inclined upwardly in the direction of gas flow.

12. A gas and liquid contact apparatus as defined in claim 9 wherein said separate sheets are spaced from the second edges of the alternate sheets thereby to define liquid discharge channels in said body between said alternate sheets and said separate sheets.

13. A gas and liquid contact apparatus as defined in claim 12 wherein the undulations of said separate sheets include at least one corrugated section inclined upwardly in the direction of gas flow.

* * * * *